United States Patent
Madara et al.

(10) Patent No.: US 6,318,966 B1
(45) Date of Patent: Nov. 20, 2001

(54) METHOD AND SYSTEM FOR CONTROLLING A COMPRESSOR

(75) Inventors: Steven M. Madara, Avon Lake; Johnthinh N. Tran, Grafton, both of OH (US); Ronald R. Rayburn, Norman, OK (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/537,744

(22) Filed: Mar. 30, 2000

Related U.S. Application Data
(60) Provisional application No. 60/129,513, filed on Apr. 6, 1999.

(51) Int. Cl.[7] .............................. F04B 49/00; F04B 19/24
(52) U.S. Cl. .............................. 417/12; 417/15; 417/417; 417/53
(58) Field of Search .................... 417/12, 15, 53, 417/44.1, 45, 44.11

(56) References Cited

U.S. PATENT DOCUMENTS

| | | | |
|---|---|---|---|
| 3,852,648 | 12/1974 | Barry et al. ........................ | 318/221 |
| 3,913,342 | * 10/1975 | Barry .................................. | 62/115 |
| 3,965,396 | * 6/1976 | Tyler et al. ........................ | 317/42 |
| 4,034,570 | 7/1977 | Anderson et al. .................. | 62/158 |
| 4,064,420 | * 12/1977 | Yuda et al. ........................ | 318/224 A |
| 4,167,966 | 9/1979 | Freeman ............................ | 165/2 |
| 4,248,053 | 2/1981 | Sisk .................................... | 62/158 |
| 4,409,795 | 10/1983 | Krueger ............................. | 62/140 |
| 4,501,125 | * 2/1985 | Han .................................... | 62/175 |
| 4,510,547 | 4/1985 | Rudich, Jr. ....................... | 361/22 |
| 4,550,770 | 11/1985 | Nussdorfer et al. .............. | 165/29 |
| 4,653,285 | 3/1987 | Pohl .................................. | 62/126 |
| 4,799,363 | 1/1989 | Nakamura ......................... | 62/160 |
| 4,843,838 | 7/1989 | Trask ................................. | 62/324.6 |
| 5,300,871 | * 4/1994 | Bucher et al. .................... | 318/794 |
| 5,329,417 | 7/1994 | Kniepkamp et al. ............. | 361/185 |
| 5,421,399 | * 6/1995 | Thompson et al. .............. | 165/29 |
| 5,560,216 | 10/1996 | Holmes ............................. | 62/161 |
| 5,687,052 | * 11/1997 | Bennett ............................. | 361/190 |
| 5,883,486 | * 3/1999 | Earhart, Jr. et al. ............. | 318/778 |
| 6,037,725 | * 3/2000 | Tolbert, Jr. ....................... | 318/110 |
| 6,172,476 | * 1/2001 | Tolbert, Jr. et al. ............. | 318/772 |

FOREIGN PATENT DOCUMENTS

| | | |
|---|---|---|
| A2 090760 | 10/1983 | (EP) . |
| 2292847 | 3/1996 | (GB) . |
| 59170481 | 9/1984 | (JP) . |
| 60011048 | 1/1985 | (JP) . |

* cited by examiner

Primary Examiner—Charles G. Freay
Assistant Examiner—Michael K. Gray
(74) Attorney, Agent, or Firm—Finnegan, Henderson, Farabow, Garrett & Dunner, L.L.P.

(57) ABSTRACT

A system and method for controlling the stage of a compressor motor and/or fan motor of a heating, ventilation, and air-conditioning system. Preferably, said system and method are used with a reversible, two stage compressor motor. The method includes, for example, switching at least one contactor connected to a source of line power to remove the source of line power to a set of relays and to a compressor motor containing a run winding, a start winding, and a common lead; waiting a predetermined period of time; and controlling the set of relays by switching the set of relays to provide the source of line power to permit switching the source of line power to either the run winding or the start winding, wherein prior to the step of controlling, the at least one contactor removes the source of line power from the set of relays.

39 Claims, 9 Drawing Sheets

METHOD AND SYSTEM FOR CONTROLLING A COMPRESSOR

CROSS REFERENCE TO RELATED APPLICATION

This application is related to and based on U.S. Provisional Patent Application No. 60/129,513, entitled "METHOD AND APPARATUS FOR CONTROLLING A COMPRESSOR" filed on Apr. 6, 1999, the disclosure of which is expressly incorporated herein by reference in its entirety.

BACKGROUND OF THE INVENTION

I. Field of Invention

The present invention is directed to a heating, ventilation, and air-conditioning system and more particularly relates to a method and system for controlling the stage of a compressor motor and/or fan motor of a heating, ventilation, and air-conditioning system. Preferably, the motor for at least one of the components is a reversible motor that reverses when the power connections to the run winding and start winding are switched.

II. Description of the Related Art

Conventional single phase alternating current induction motors for driving compressors are connected to a source of power by a line contactor. Electric motors typically include a stator which is wound with a start winding and run winding connected to the source of power. The stator winding surrounds the motor which rotates a shaft to produce the motor output. In circuit with the run winding and the start winding are a run capacitor and a start capacitor, respectively. In capacitor start motors, start circuits are connected in parallel with a run winding of each speed of the multi-speed motor. The start circuits include a start winding which is connected in series with start capacitors. During a motor start, both the run winding and the start winding are connected across the motor's power source to magnetically excite the rotor and cause rotation. The start winding and start capacitor combination is used to provide the high torque required during typical start conditions. However, the capacitance necessary to start the motor is typically too large for optimum motor efficiency during normal operation. Therefore, a switch or start relay is usually connected in series with a start capacitor and is used to disengage the start circuit when the motor has reached a predetermined speed or after a predetermined time has elapsed.

When the normally closed start relay deenergizes, the start relay contacts close. If the start relay contacts should happen to open when the run capacitor is fully charged, there is a large amount of energy stored in the run capacitor that can be discharged into the start capacitor when the start relay contactor is closed. There is sufficient power to weld the start relay contacts and thus disable the relay for the next operation.

In view of the foregoing, traditional compression motors are connected to a source of power by a line contactor. Furthermore, traditional compressor motors include a start winding, a run winding, a start capacitor, and a run capacitor. Moreover, certain heating, ventilation, and air conditioning systems include a conventional compressor motor, as described above, and a fan motor and a capacitor for the fan motor. Consequently, compressor motors and the associated components for heating, ventilation, and air conditioning systems may operate in higher power environments and may require higher cost.

SUMMARY OF THE INVENTION

Accordingly, the present invention is directed to a method and system for controlling a compressor, preferably a two stage compressor that operates in a first stage when the motor rotates in one direction and operates in a second stage when the motor rotates in the reverse direction.

An object of advantage of the present invention is to provide an improved system and method of motor control that overcomes or minimizes one or more of the limitations and disadvantages of the presently available control systems and methods for such compressors and heating, ventilation, and air conditioning (hereinbelow HVAC) systems.

Among other things, the invention reduces the number and cost associated with controlling a two stage compressor by, for example, requiring only one contactor for the application of line power to the condenser fan and compressor motor; implementing a single dual run capacitor for the condenser fan and compressor motor; utilizing a minimum of industry standard components; eliminating the need for a separate condenser fan relay; and using simple control logic. Under the present invention, the power connections to the start winding and run winding of the motor for the compressor are reversed, to thereby change the power characteristics and reverse the motor rotation, by standard, inexpensive relays that are switched when the contactor is open, thereby removing power from the relays and motor windings during this switching. The contactor is preferably open for a sufficient period of time to allow the motor to stop rotating and to ensure that no high currents are applied to the relays during the switching. Preferably, most, if not all, of the components can be placed into a standard sized control box of the HVAC system.

Additional features and advantages of the invention will be set forth in part in the description which follows and in part will be obvious from the description, or may be learned by practice of the invention. The objectives and advantages of the invention may be realized and attained by the system and method particularly pointed out in the written description and claims hereof as well as the appended drawings.

To achieve these and other advantages and in accordance with the purpose of the invention, as embodied and broadly described herein, there is provided a method for controlling a two stage, reversible compressor, such as the Bristol Twin Single compressor. Compressors of this type and their use and application are explained in detail in U.S. patent application Ser. No. 09/133,841, filed on Aug. 13, 1998 and entitled "Two Stage Reciprocating Compressors and Associated HVAC Systems and Methods," and in U.S. patent application Ser. No. 09/235,288, having a filing date of Jan. 22, 1999, and entitled Variable Capacity Compressor Having Adjustable Crankpin Throw Structure, both of which applications are hereby incorporated by reference. Such compressors operate at a first stage when the motor rotates in one direction and at a second stage when the motor rotates in a reverse direction. By means of example, such a compressor with two cylinders may reciprocate the pistons in both cylinders at one stage and will reciprocate only one piston at the other stage. Such a compressor having a single cylinder will reciprocate the piston at full stroke when the motor rotates in one direction and at a lesser stroke (e.g. half stroke) when the motor rotates in the other direction.

The method for controlling the motor of a compressor, such as the Bristol Twin Single compressor, with a system of the present invention includes switching at least one contactor connected to a source of line power to remove the source of line power to a set of relays and to a compressor motor containing a run winding, a start winding, and a common lead; and controlling the set of relays by switching the set of relays to provide the source of line power to permit switching the source of line power to either the run winding or the start winding, wherein prior to the controlling, the at least one contactor removes the source of line power from the set of relays; and waiting a predetermined period of time before performing the controlling.

Also in accordance with the present invention, there is provided a system for controlling an HVAC system with a compressor, such as the Bristol Twin Single compressor. The system includes, preferably, a compressor motor; a fan motor; an electronic controller; a contactor controlled by the electronic controller, wherein the electronic controller determines whether to apply a source of line power to the contactor and the system; and a dual-run capacitor for operating the two-stage reversible compressor and the fan motor.

In yet another embodiment of the present invention, there is provided a computer readable medium containing computer software, which, when run on a computer causes the computer to provide apparatus for controlling the motor of a compressor. The apparatus includes means for switching of at least one contactor connected to a source of line power to remove the source of line power to a set of relays and to a compressor motor containing a run winding, a start winding, and a common lead; means for controlling the set of relays by switching the set of relays to provide the source of line power to permit switching the source of line power to either the run winding or the start winding, wherein prior to switching by the means for controlling, the at least one contactor removes the source of line power from the set of relays; and means for waiting a predetermined period of time before the means for controlling switches the set of relays.

The systems and methods of the present invention preferably utilize readily available and inexpensive components that can be operated by relatively simple logic and a standard electronic controller. The logic can be loaded or incorporated into a relatively simple and inexpensive controller, such as a data processor, computer, microcomputer, or integrated computer chip. Preferably, the system and its components are designed and integrated so that the components can fit within a standard sized control box for the HVAC system that includes the two stage compressor and preferably a fan motor. In certain embodiments, one or more of the relays of the present invention can be positioned outside the control box or on a separate control board. In addition, when the compressor is one that has a larger power rating, more than two relays may be required to provide the needed power, while still utilizing standard and inexpensive relay components.

It is to be understood that both the foregoing general description and the following detailed description are exemplary and explanatory only and are not restrictive of the invention, as described.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Generally, the present invention is directed to controlling a compressor by changing the stage (e.g., the speed and/or direction) of a compressor motor utilizing, among other things, an electronic controller, a contactor, and a set of relays.

Figure 1:
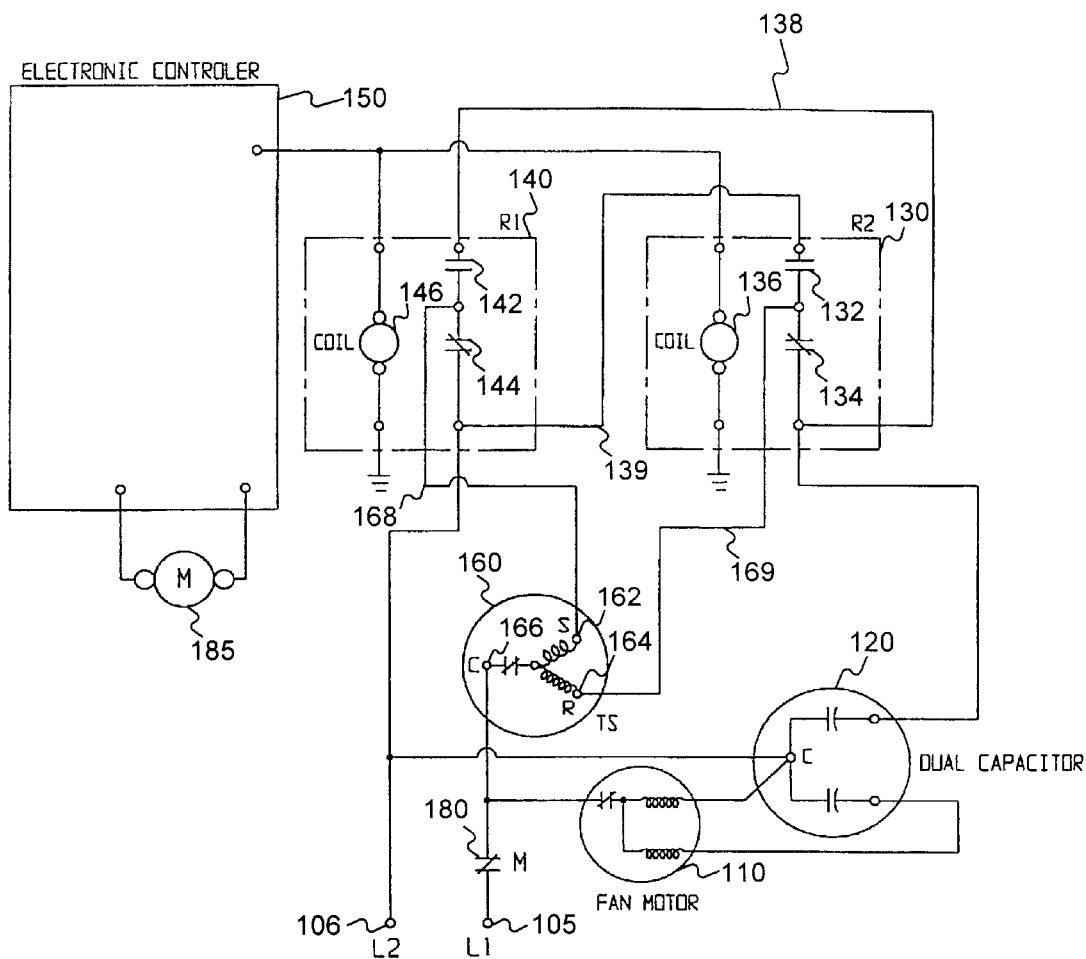
FIG. 1 illustrates an exemplary wiring scheme for use with a two stage compressor, in accordance with the present invention.

FIG. 1 illustrates an exemplary system 100 capable of executing the steps associated with controlling a compressor by changing the stage (e.g., the speed and/or direction) of a compressor motor utilizing, among other things, an electronic controller, a contactor, and a set of relays. As shown in FIG. 1, the system 100 includes a first terminal 105, a second terminal 106, a relay 180, 185, a fan motor 110, a capacitor 120, a compressor motor 160, a set of relays 130, 140, and an electronic controller 150.

The relay (M) 180, 185 includes, for example, a coil 185 and contactor 180 to repeatedly open or close an electrical connection based on a control signal from the electronic controller 150. The contactor 180 is electrically connected to the fan motor 110 and a common lead 166 of the compressor motor 160. Although the contactor 180 illustrated in FIG. 1 is of a single-pole type, a contactor 180 of the two-pole type may be implemented as the contactor 180 without departing from the spirit of the invention. Preferably, the contactor 180 is rated to satisfy the maximum anticipated current during switching (i.e., maximum switching current). More preferably, the contactor 180 is rated to satisfy the average current during a locked rotor state of the compressor motor. By way of non-limiting example, in an embodiment of the present invention for a 4 ton compressor, the contactor 180 is rated to provide about 30 amps maximum switching current and about 180 amps average current during locked rotor state. In another embodiment of the present invention for a 5 ton compressor, the contactor 180 is rated to provide about 40 amps maximum switching current and about 200 amps average current during locked rotor state.

The first terminal (L1) 105 and the second terminal (L2) 106 include, for example, terminals to permit a source of line power to be connected to the first terminal (L1) 105 and the second terminal 106. Further, the first terminal 105 is electrically connected to the contactor (M) 180.

The compressor motor (TS) 160 includes the common lead 166, a run winding (R) 164, and a start winding (S) 162. Preferably, the compressor motor 160 is a motor for a two stage compressor, with or without associated HVAC components, more preferably a reversible motor for a compressor that operates at a first stage, when rotated in one direction, and at a second stage, when operated in the reverse direction. In an embodiment of the present invention, the two stage, reversible compressor includes the Bristol Twin Single compressor. Although this embodiment illustrates an application to a single phase motor, the invention can also be applied to a three-phase motor for use in, for example, an HVAC system. The compressor motor 160 is electrically connected to, among other things, the set of relays 130, 140.

Each of the set of relays 130, 140 includes, a coil 136, 146, a first contact 132, 142, and a second contact 134, 144. Preferably, the first contact 132, 142 is normally open, and the second contact 134, 144 is normally closed. Moreover, each of the set of relays 130, 140 consists, preferably, of low cost, low power, standard relays such as, for example, a single pole, double throw (SPDT) relay and/or a double pole, double throw relay (DPDT). In an exemplary embodiment, each of the set of relays consisted of P&B T9A relays or equivalent relays. Preferably, each of the set of relays 130, 140 can be placed on the same printed circuit board (e.g., a 4 inch by 3 inch printed circuit board) within the same standard sized control box. However, each of the set of relays 130, 140 can be placed on separate printed circuit boards or outside the standard sized control box if size, heat, or other factors call for such placement.

Further, the set of relays 130, 140 includes, preferably, a first interconnection 138 and a second interconnection 139 that directly connect the normally open contactor of one of the set of relays (e.g., relay 130) with the normally closed contactor of the other relay (e.g., relay 140). More preferably, the set of relays 130, 140 includes, a run winding interconnection 169 that connects the run winding 164 with the junction of the first contact 132 (i.e., normally open) and the second contact 134 (i.e., normally closed). Still more preferably, the set of relays 130, 140 includes a start winding interconnection 168 that connects the start winding 162 with the junction of the first contact 142 (i.e., normally open) and the second contact 144 (i.e., normally closed). This novel interconnection minimizes the number of relays required to control the HVAC system and permits the use of only one contactor (e.g., contactor 180) to remove the source of line power. Furthermore, the present invention permits the use of only a single contactor 180 and a single capacitor 120, which eliminates the need for a second higher power and higher cost contactor and eliminates the need for a second capacitor (i.e., one for the fan motor and one for the compressor motor). As a result, the present invention saves space within the control box and reduces cost.

Each set of relays 130, 140 is, preferably, rated to satisfy the average current during normal operation of the compressor motor 160 and the maximum switching current. Since the present invention only switches the set of relays 130, 140 when the source of line power is eliminated, the maximum switching current for each of the set of relays 130, 140 is significantly lower, when compared to past approaches. In fact, the maximum switching current of the set of relays 130, 140 is drastically reduced, which makes the non-switching current rating of the set of relays more of a design concern than the maximum switching current when selecting such relays. Moreover, the present invention reduces arcing when switching the set of relays 130, 140.

The fan motor 110 is an standard fan motor such as, for example, a standard fan motor as used in an HVAC system. Further, the fan motor 110 preferably operates a fan for a condenser associated with the HVAC system serviced by the compressor. The fan motor 110 is electrically connected to a capacitor 120. The capacitor 120 is, preferably, a dual-run capacitor for operating the compressor motor 160 and the fan motor 110. Preferably, the dual-run capacitor is connected to the source of line power L1, L2 and the capacitor 120 in such a manner as to permit the fan motor 110 to operate continuously while the contactor 180 is open, which corresponds to when the source of line power is applied to the fan motor 110, capacitor 120, and set of relays 130, 140. More preferably, the capacitor 120 is mounted within the standard sized control box containing, inter alia, the set of relays 130, 140. Accordingly, embodiments consistent with the present invention eliminate the need for multiple capacitors including, for example, a separate capacitor for the compressor motor 160 and a separate capacitor for the fan motor 110.

The electronic controller 150 can be implemented with a variety of logic devices, components, subsystems, and systems capable of controlling various devices in accordance with principles and purpose of the present invention. Furthermore, the electronic controller 150 may include a data processor (not shown) or a set of data processors to perform the functions of controlling the stage of a compressor motor and/or fan motor of an HVAC system. Moreover, the electronic controller 150 may also include, for example, one or more of the following additional components: one or more central processing units, a co-processor, memory, storage, registers, an input device, an output device, and/or other data processing devices and systems as appropriate.

Further, the electronic controller 150 and/or any of the above components may be embodied in any suitable combination of hardware, software, or firmware and may be embodied as a separate system or incorporated into another device. Further, the electronic controller 150 may be connected to a device (not shown) that measures temperature, humidity, and/or pressure (e.g., a thermostat, a humidity sensor, and/or a pressure sensor) that signals whether the electronic controller 150 should initiate a control operation to place the system 100 in another state (e.g., off, first stage, or second stage) based upon, for example, temperature, humidity, or pressure. Although the embodiments described herein make reference to a thermostat for signaling whether the electronic controller 150 should initiate a control operation to place the system 100 in another state, a pressure sensor and/or humidity sensor could also be used without departing from the spirit of the invention.

By way of non-limiting example, the electronic controller 150 controls the operation of the contactor 180 and the set of relays 130, 140, to operate the compressor motor 160 and fan motor 110 at desired times and modes, in response to sensed conditions (e.g. heating or cooling) of the space to be conditioned by the HVAC system, or the temperature of ambient air, or both. According to the invention, the electronic controller 150 switches the set of relays 130, 140 only when the contactor 180 is open, and, thus, the source of line power is not applied to the set of relays 130, 140 or the start winding 162 and run winding 164, during switching. In addition, the electronic controller 150 waits a predetermined period of time (e.g., between about 1 second and 10 minute) after the contactor 180 is switched off, before switching the set of relays 130, 140. The predetermined period time is preferably selected to allow the compressor motor 160 and the electronic components of the compressor motor 160 to stabilize and to thereby minimize any potential damage to the compressor motor 160 and the electronic components of the system 100. The optimum predetermined time for a given HVAC system can be determined through empirical testing. Accordingly, embodiments consistent with the present invention minimize the number of relays and/or contactors and reduce the power rating for these relays and/or contactors because switching of the set of relays 130, 140 is always done when the contactor 180 is in an off condition, which removes the connection to the source of line power.

By way of non-limiting example, in an embodiment for a 4 ton compressor, the contactor 180 is rated for about 30 amps maximum switching current and about 180 amps sustained current during locked rotor state. Furthermore, each of the set of relays 130, 140 is rated for about 30 amps average current during normal operation (i.e., non-switching current rating) and about 10 amps maximum switching current. Accordingly, the maximum switching current of each of the set of relays 130, 140 is less than or equal to about 90% of the maximum switching rating of the contactor 180, and the non-switching current of each of the set of relays 130, 140 is less than or equal to about 80% of the maximum switching rating of the contactor 180. The present invention thus enables a drastic reduction in the rating of the maximum switching of the set of relays, which enables selecting the non-switching current rating of the set of relays based upon the anticipated current load of the compressor motor and fan motor. Furthermore, the novel combination of elements of the system 100 reduces the need for, inter alia, a second contactor. Unlike past approaches that would have required a second contactor (e.g., connected to the second terminal 106) rated at 30 amps maximum switching current in a 4 ton compressor environment, the present invention reduces the number of components and cost of the system 100 by eliminating the need for the second contactor.

Figure 2:
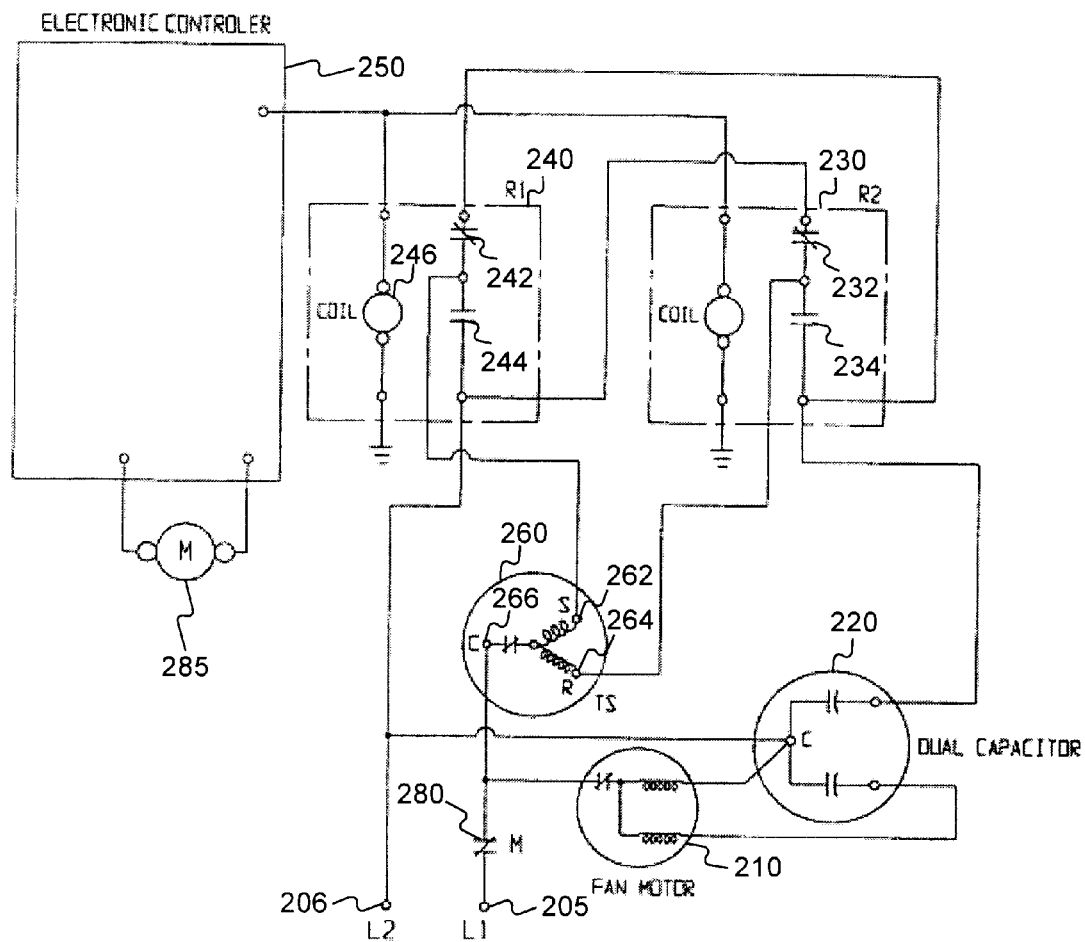
FIG. 2 illustrates an exemplary wiring scheme for use with a two stage compressor after the electronic controller switches the set of relays, in accordance with the present invention.

FIG. 2 illustrates the system of FIG. 1 after the set of relays 130, 140 of FIG. 1 are switched under the control of the electronic controller 150. Referring to FIG. 2, the set of relays 230, 240 of FIG. 2 correspond to the set of relays 130, 140 of FIG. 1 respectively. Referring again to FIG. 1, the system 100 illustrates the contacts 132, 142 in a normally open (NO) state and illustrates the contacts 134, 144 in a normally closed (NC) state. Referring again to FIG. 2, the system 200 illustrates the contacts 232, 242 after switching to a closed state and illustrates the contacts 234, 244 after switching to an open state. Such switching is done under the control of the electronic controller 150, 250, when the contactor 180, 280 is open.

Figure 3:
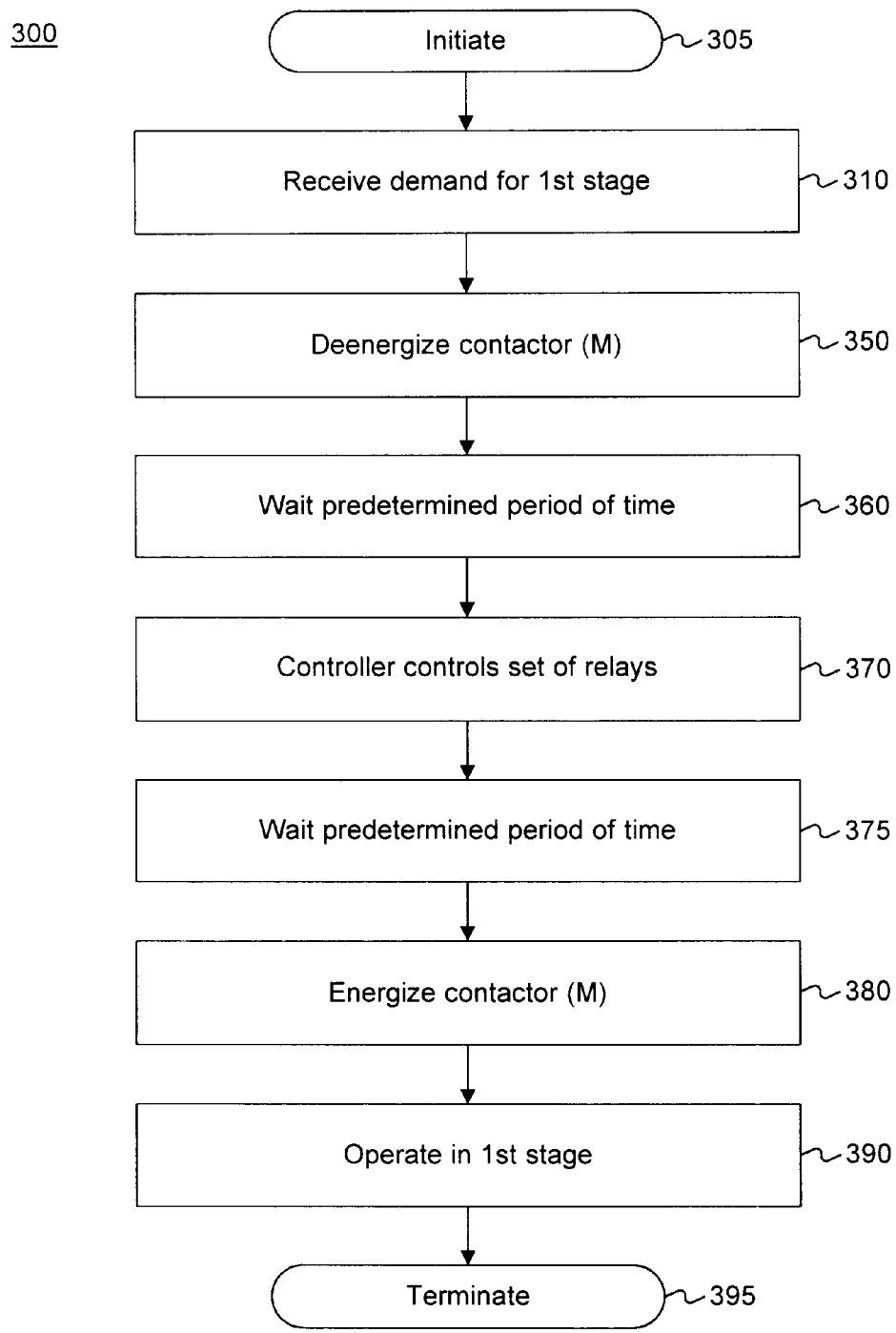
FIG. 3 is an exemplary flowchart depicting steps associated with controlling the stage of a compressor motor and/or fan motor of a HVAC system when a demand for a first stage of heating or cooling is received, in accordance with the present invention.

FIG. 3 is an exemplary flow chart 300 depicting steps associated with controlling the compressor motor 160 when a demand for a first stage of heating or cooling is received, in accordance with the present invention. Referring to FIG. 3, if the thermostat (not shown) or other device (e.g., a pressure sensor or humidity sensor) senses that the first stage of the compressor motor is required for heating or cooling, the thermostat initiates (step 305) the steps associated with controlling the compressor motor 160 by providing a signal demanding a first stage to the electronic controller 150. The electronic controller 150 receives (step 310) the signal from the thermostat indicating that the first stage of the compressor motor is required for heating or cooling. The electronic controller 150 then de-energizes the contactor (M) 180 (step 350); waits a first predetermined period of time (step 360); controls the set of relays 130,140 to switch the source of line power to either the run winding 164 or the start winding 162 (step 370); waits a second predetermined period of time (step 375); and energizes the contactor (M) 180 (step 380). The system 100 thus places the compressor motor 160 in the first stage of heating or cooling and continues to operate in the first stage (step 390) until a demand for the second stage is made (see, e.g., step 405 at FIG. 4) or until the first stage is satisfied and the contactor 180 and the compressor motor 160 can be de-energized (step 395). Preferably, the step of controlling the set of relays to switch the source of line power (step 370) includes switching the dual-run capacitor 120 to either the run winding 164 or the start winding 162 that is not connected to the source of line power. More preferably, steps 350–370 may not be required during initial start up of the system 100.

To initiate the steps associated with the first stage of the compressor motor (step 305), the thermostat (not shown) senses air temperature (e.g., indoor air temperature) and determines that the first stage of the compressor motor 160 is required for heating or cooling. The thermostat provides a signal to the electronic controller 150. The electronic controller 150 receives (step 310) from the thermostat, the signal from the thermostat indicating that the first stage of the compressor motor 160 is required for heating or cooling. Preferably, after receiving the signal, the electronic controller 150 waits a sufficiently long period of time (e.g., between about 30 seconds and 10 minutes). After this sufficiently long period of time elapses, the electronic controller 150 verifies that the thermostat still demands a first stage and, then, proceeds with step 310. The optimum sufficiently long period of time for a given HVAC system can be determined empirically and is usually selected to ensure stable and safe operation of the HVAC system (e.g., between 30 seconds and 10 minutes).

To de-energize the contactor (M) 180 (step 350), the electronic controller 150 provides a control signal to the coil 185 for the contactor (M) 180. The control signal switches the contactor 180. In the exemplary embodiment of FIG. 1, the control signal switches the contactor 180 to an open position to de-energize the contactor 180. When the contactor 180 is de-energized, the source of line power connected to the first terminal 105 and second terminal 106 is removed from the compressor motor 160 and the fan motor 110. The novel use of an electronic controller 150 in combination with only one contactor 180 eliminates the need for multiple contactors to remove power from the system 100. Accordingly, the present invention reduces the cost and the size of the system 100, when compared to past approaches.

Referring again to FIG. 3, to wait a first predetermined period of time (step 360), the electronic controller 150 waits until the first predetermined period of time elapses before proceeding (e.g., to step 370). By waiting the first predetermined period of time (e.g., between 1 second and 10 minute) the electronic controller 150 avoids damaging the set of relays 130,140. As a result, embodiments consistent with the present invention reduce the power rating required for the set of relays 130, 140 because switching is always done when the contactor 180 is in an off condition. Furthermore, the first predetermined time of step 360 is preferably selected to allow the compressor motor 160 and the electronic components of the motor to stabilize. Embodiments consistent with the present invention thus minimize any potential damage to the compressor motor 160, fan motor 110, and the electronic components of the system 100.

To control the set of relays 130, 140 to switch the source of line power to either the run winding 164 or the start winding 162 and to switch the dual-run capacitor 120 to either the run winding 164 or the start winding 162 that is not connected to the source of line power (step 370), the set of relays 130,140 are interconnected in a novel manner as illustrated in FIG. 1. In the present embodiment, referring again to FIG. 1, the contacts 132, 142 of the set of relays 130, 140 are, preferably, in a normally open (NO) state and the contacts 134, 144 of the set of relays 130, 140 are in a normally closed (NC) state. Consequently, in a normal state, the set of relays 130, 140 provide the source of line power (e.g., the second terminal 106) to the start winding 162 and provide the dual run capacitor 120 connection to the run winding 164. However, one of ordinary skill would recognize that the normal state (e.g., NO, NC) of the contacts can be reversed without departing from the spirit of the invention.

Referring again to FIG. 3, to wait a second predetermined period of time (step 375), the electronic controller 150 waits until the second predetermined period of time elapses before proceeding (e.g., to step 380). As with step 360, by waiting the second predetermined period of time (e.g., between 1 second and 10 minutes), the electronic controller 150 avoids damaging the set of relays 130, 140. Furthermore, the second predetermined time is selected to allow the compressor motor 160 and the electronic components of the compressor motor 160 to stabilize, which minimizes any potential damage to the compressor motor 160, fan motor 110, and the electronic components of the system 100.

To energize the contactor (M) 180 (step 380), the electronic controller 150 provides a control signal to the coil 185 for the contactor 180. The control signal switches the contactor 180 closed, which energizes the contactor 180. When the contactor 180 is energized, the source of line power is provided to the compressor motor 160 and the fan motor 110, which places the compressor motor 160 in a first stage of heating or cooling (step 390).

Figure 4:
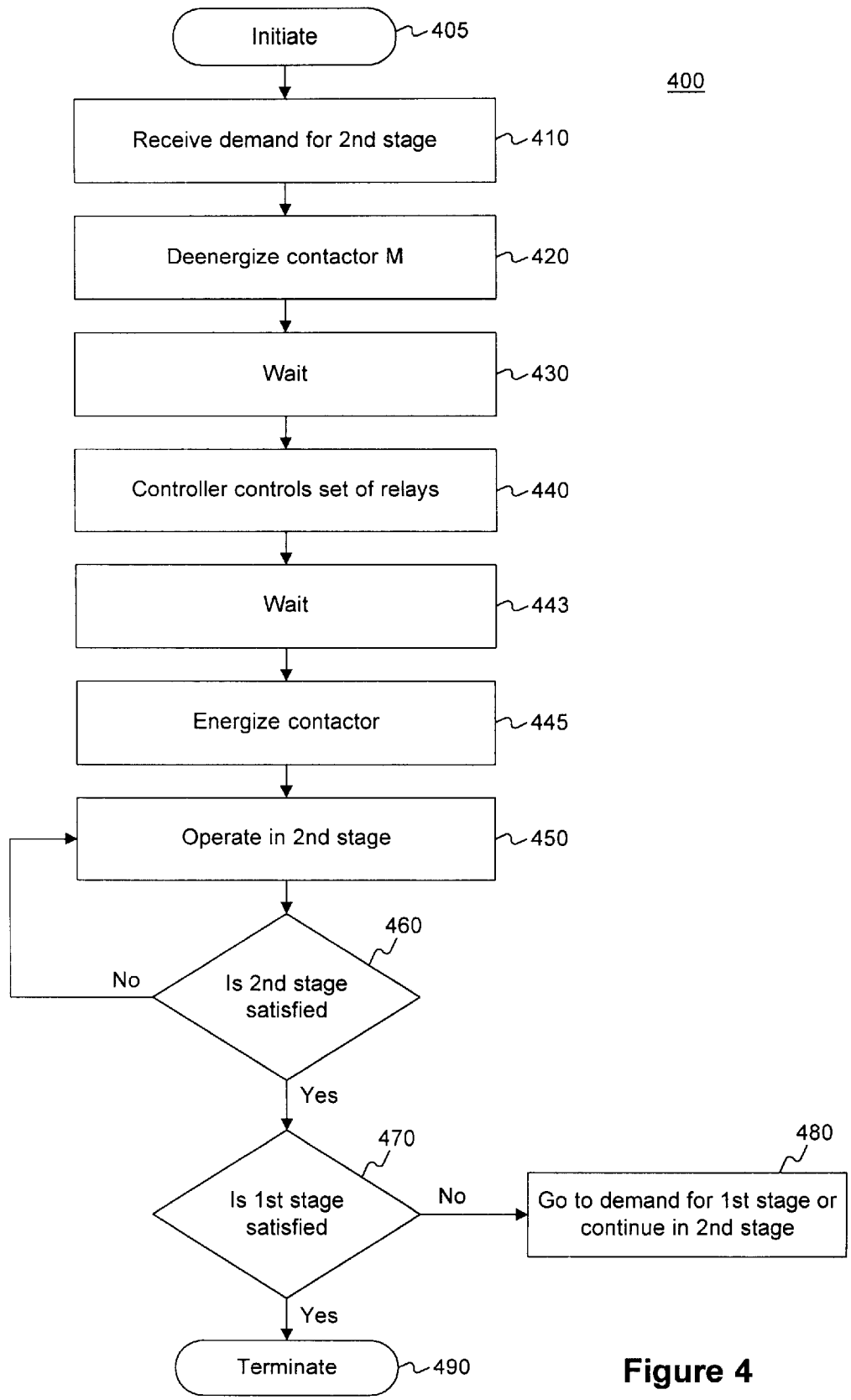
FIG. 4 is another exemplary flowchart depicting steps associated with controlling the stage of a compressor motor and/or fan motor of a HVAC system when a demand for a second stage of heating or cooling is received, in accordance with the present invention.

To continue operating in the first stage of heating or cooling, the electronic controller 150 does not change the state (e.g., does not switch) of the contactor 180 or the set of relays 130, 140. If a demand for the second stage is made by the thermostat while the compressor motor 160 operates in the first stage, the electronic controller 150 may proceed to executes a series of steps as illustrated at FIG. 4. Further, if the first stage is satisfied and the thermostat no longer demands either a first stage or second stage, the electronic controller 150 may de-energize the contactor 180, which thereby removes the source of line power from the compressor motor 160 and fan motor 110, and terminates the operation of the compressor motor 160.

Preferably, the embodiment illustrated in FIG. 1 may be utilized with a two stage compressor (e.g., a reversible compressor) that does not require compressor start components and that requires a power load of no more than a predetermined maximum load, e.g. approximately 30 amps.

FIG. 4 is another exemplary flowchart depicting steps associated with controlling the stage of a compressor motor and/or fan motor of a HVAC system when a demand for a second stage of heating or cooling is received, in accordance with the present invention. Referring to FIG. 4, if the thermostat (not shown) senses that the second stage of the compressor motor is required for heating or cooling (e.g., when additional heating or cooling is required), the thermostat initiates (step 405) the steps 400 associated with controlling the compressor motor 160 by providing a signal demanding a second stage to the electronic controller 150. The electronic controller 150 receives (step 410) the signal from the thermostat indicating that the second stage of the compressor motor is required for heating or cooling. The electronic controller 150 then de-energizes the contactor (M) 180 (step 420); waits a first predetermined period of time (step 430); controls the set of relays 130,140 to switch the source of line power to either the run winding 164 or the start winding 162 (step 440); waits a second predetermined period of time (step 443); and energizes the contactor (M) 180 (step 445). The system 100 thus places the compressor motor 160 in the second stage of heating or cooling (step 450) and continues to operate in the second stage (no at step 460) until the second stage of heating or cooling is satisfied (e.g., the desired temperature is attained).

When the second stage of heating or cooling is satisfied (yes at step 460), the electronic controller 160 determines if a demand for first stage of heating or cooling exists. If a demand for first stage of heating or cooling exists (no at 470), the electronic controller 150 either continues in the second stage of heating or cooling or proceeds to execute the steps (e.g., 300 at FIG. 3) associated with controlling the compressor motor 160 to provide a first stage of heating or cooling (step 480). If a demand for first stage of heating or cooling does not exists (yes at 470), the electronic controller 150 terminates operation (step 490) by, preferably, de-energizing the contactor 180, waiting a first predetermined period of time, and de-energizing the set of relays. Preferably, the step of controlling the set of relays 130, 140 to switch the source of line power (step 440) includes switching the dual-run capacitor 120 to either the run winding 164 or the start winding 162 that is not connected to the source of line power. More preferably, steps 420–440 may not be required during initial start-up.

Figure 5:
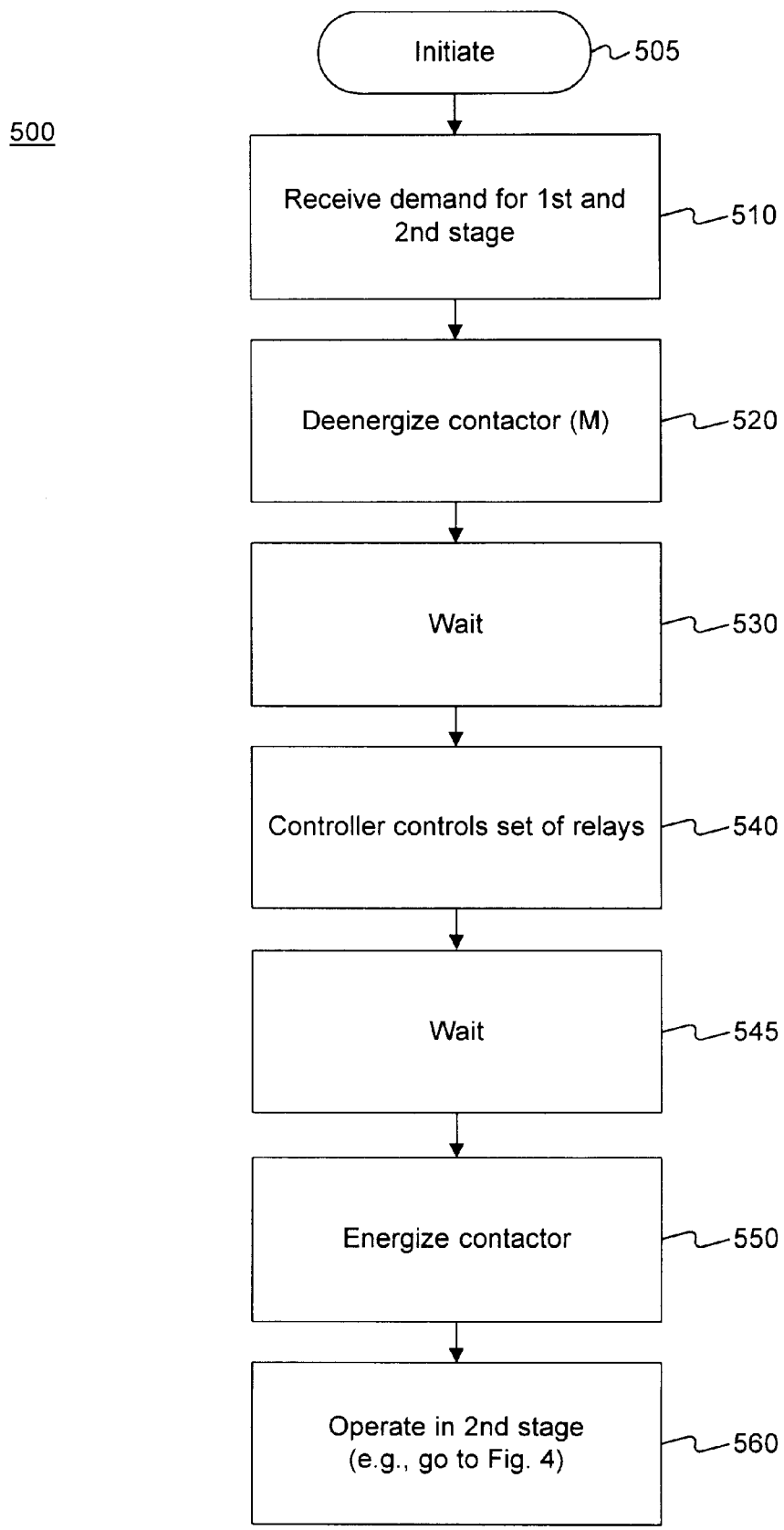
FIG. 5 is yet another exemplary flowchart depicting steps associated with controlling the stage of a compressor motor and/or fan motor of a HVAC system when a demand for a first stage and a second stage of heating or cooling is received, in accordance with the present invention.

FIG. 5 is yet another exemplary flowchart depicting steps associated with controlling the stage of a compressor motor and/or fan motor of a HVAC system when a demand for a first stage and a second stage of heating of cooling is received, in accordance with the present invention. By way of non-limiting example, a thermostat (not shown) may make a demand for first stage and second stage of heating or cooling when a higher amount of heating or cooling is required. Referring to FIG. 5, if the thermostat senses that the first stage and the second stage of the compressor motor is required for heating or cooling, the thermostat initiates (step 505) the steps 500 associated with controlling the compressor motor 160 by providing a signal demanding a first stage and a second stage to the electronic controller 150. The electronic controller 150 receives (step 510) the signal from the thermostat indicating that the first stage and the second stage of the compressor motor 160 are required for heating or cooling. The electronic controller 150 then de-energizes the contactor (M) 180 (step 520); waits the first predetermined period of time (step 530); controls the set of relays 130, 140 to switch the source of line power to either the run winding 164 or the start winding 162 (step 540); waits the second predetermined period of time (step 545); and energizes the contactor (M) 180 (step 550). The system 100 thus places the compressor motor 160 in the first stage of heating or cooling. Preferably, step 520 may not be required during initial start-up.

If a demand for a second stage of heating or cooling still exists, the electronic controller 150 proceeds to execute the steps (e.g., 400 at FIG. 4) associated with operating in the second stage (step 560). Preferably, the step of controlling the set of relays 130,140 to switch the source of line power (step 540) also switches the dual-run capacitor 120 to either the run winding 164 or the start winding 162 that is not connected to the source of line power.

In an embodiment of the present invention, the electronic controller 150 preferable anticipates the second stage of heating or cooling. The electronic controller 150 anticipates the demand for the second stage by determining whether the demand for the second stage is made while the system 100 is operating in the first stage; and initiating a demand for the second stage when the demand for the first stage is made.

By way of non-limiting example, when the electronic controller 150 receives a demand for the first stage (e.g., of heating or cooling) and a demand for the second stage (e.g., of heating or cooling), the electronic controller 150 stores a quantity (e.g., one) representative of receiving the demand for the second stage while the system 100 is operating in the first stage. When the electronic controller 150 determines that the demand for the first stage and second stage is removed (e.g., when the demand for heating or cooling is satisfied), the electronic controller 150 waits for the next demand for a first stage or a second stage.

If the next demand to the electronic controller 150 is for the first stage and the second stage, the electronic controller 150 stores a number representative of receiving a second demand (e.g., two) for the second stage, which was made while the system 100 was operating in the first stage. When the electronic controller 150 determines that the second demand for the first stage and second stage is removed (e.g., when the demand for heating or cooling is satisfied), the electronic controller 150 waits for the next demand for a first stage or a second stage.

On the next demand for a first stage, the electronic controller 150 anticipates the demand for a second stage by initiating the second stage when the demand for the first stage is made. The electronic controller 150 thus eliminates the need for the system 100 to switch from first to second stage operation when the demand for the first stage is close to or at the second stage demand level. Accordingly, the electronic controller 150 increases comfort to the consumer; minimizes the number of starts and stops of the compressor and other components; and increases the life of the compressor and such components.

Although in the above embodiment, the electronic controller 150 anticipates the demand for a second stage of heating or cooling after two cycles (i.e., two consecutive demands for a first stage and a second stage), the electronic controller 150 may anticipate a second stage of heating or cooling after multiple cycles (e.g., after more than two cycles) by comparing a quantity representative of the number consecutive demands for a first stage and a second stage to a predetermined quantity and initiating the second stage when the quantity exceeds the predetermined quantity.

On subsequent demands for a first stage, the electronic controller 150, preferably, continues to anticipate the second stage when the demand for a first stage is made unless the electronic controller 150 determines that the run time for the second stage is shorter than a preset time (5 minutes to 30 minutes). When the electronic controller 150 determines that the run time for the second stage is shorter than a preset time, the electronic controller 150 will not anticipate the second stage and will start the compressor in the first stage on the next demand for a first stage.

Figure 6:
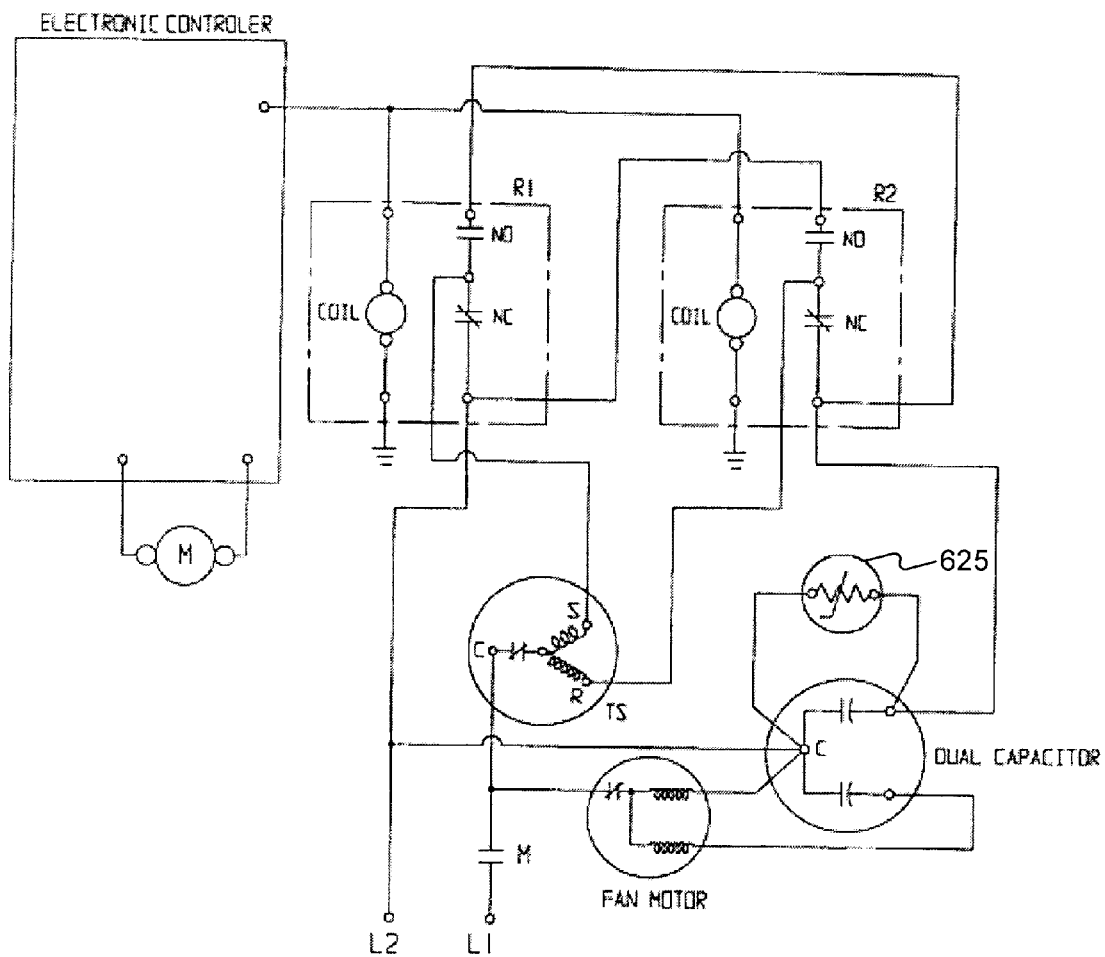
FIG. 6 illustrates an exemplary wiring scheme for use with a two stage compressor that uses a soft start assist positive temperature coefficient thermistor (PTCR) and a power load of no more than a predetermined maximum load, e.g. approximately 30 amps, in accordance with the present invention.

If compressor start components are required, the present invention permits the embodiment illustrated in FIG. 1 to be readily modified by adding a soft start assist positive temperature coefficient thermistor (PTCR). FIG. 6 illustrates an exemplary modification of the embodiment of FIG. 1 that uses the soft start assist positive temperature coefficient thermistor (PTCR) 625. Consequently, the present invention facilitates adding a start device such as the PTCR soft start.

Figure 7:
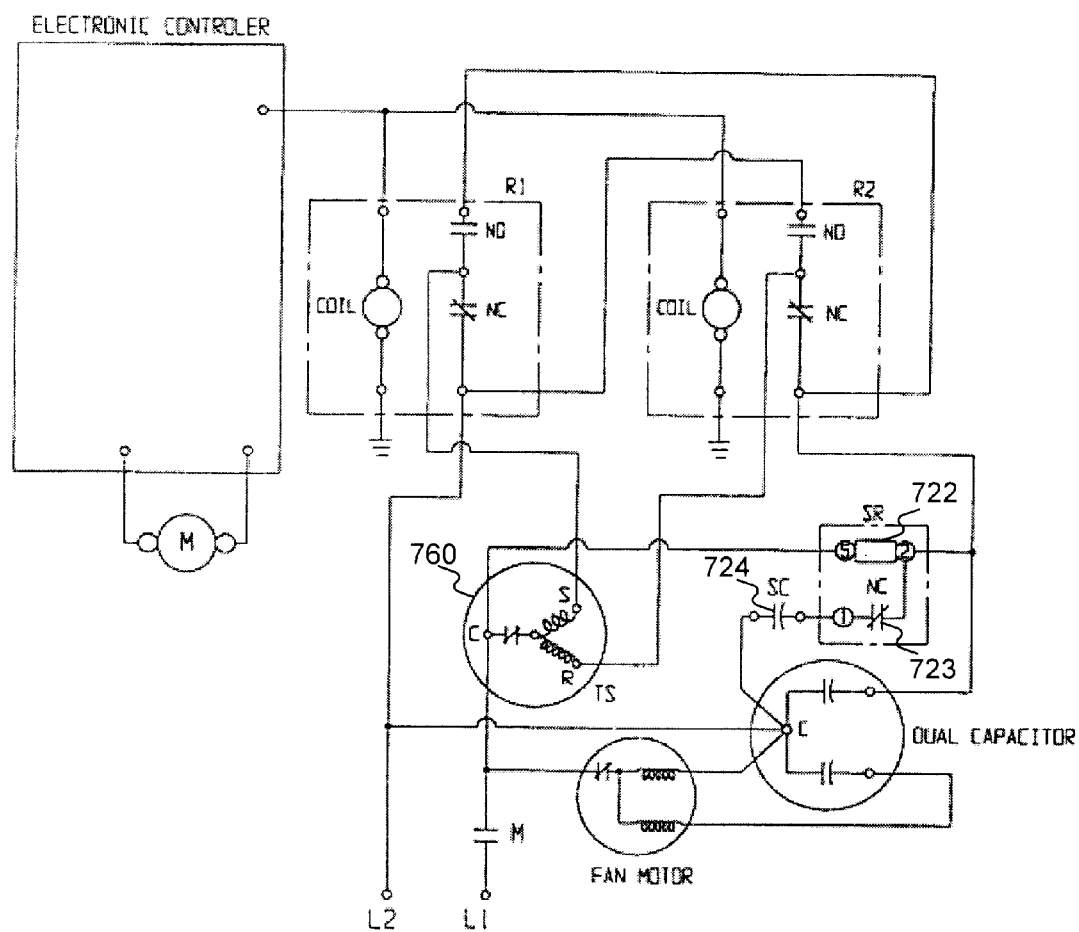
FIG. 7 illustrates an exemplary wiring scheme for use with a two stage compressor that uses hard start assist components and a power load of no more than a predetermined maximum load, e.g. approximately 30 amps, in accordance with the present invention.

Alternatively, if hard start assist components are required, the embodiment illustrated in FIG. 1 may be modified as shown in FIG. 7 by adding a start relay (SR) 722, a start capacitor (SC) 724, and a contactor 723. Referring to FIG. 7, although the contactor 723 is illustrated with a normally closed (NC) contactor 723, one of ordinary skill may modify FIG. 7 to utilize a normally open contactor. Alternatively, the hard start assist components 722, 723, 724 may consist of a "Kickstart" start device as disclosed in U.S. Pat. No. 5,162,718. Further, the motor 760 of FIG. 7 may be implemented with a single-cylinder motor or with a two-cylinder motor (e.g., with a high-speed mode and a low-speed mode) without departing from the spirit of the invention disclosed herein. Accordingly, the present invention facilitates adding a hard start device.

Figure 8:
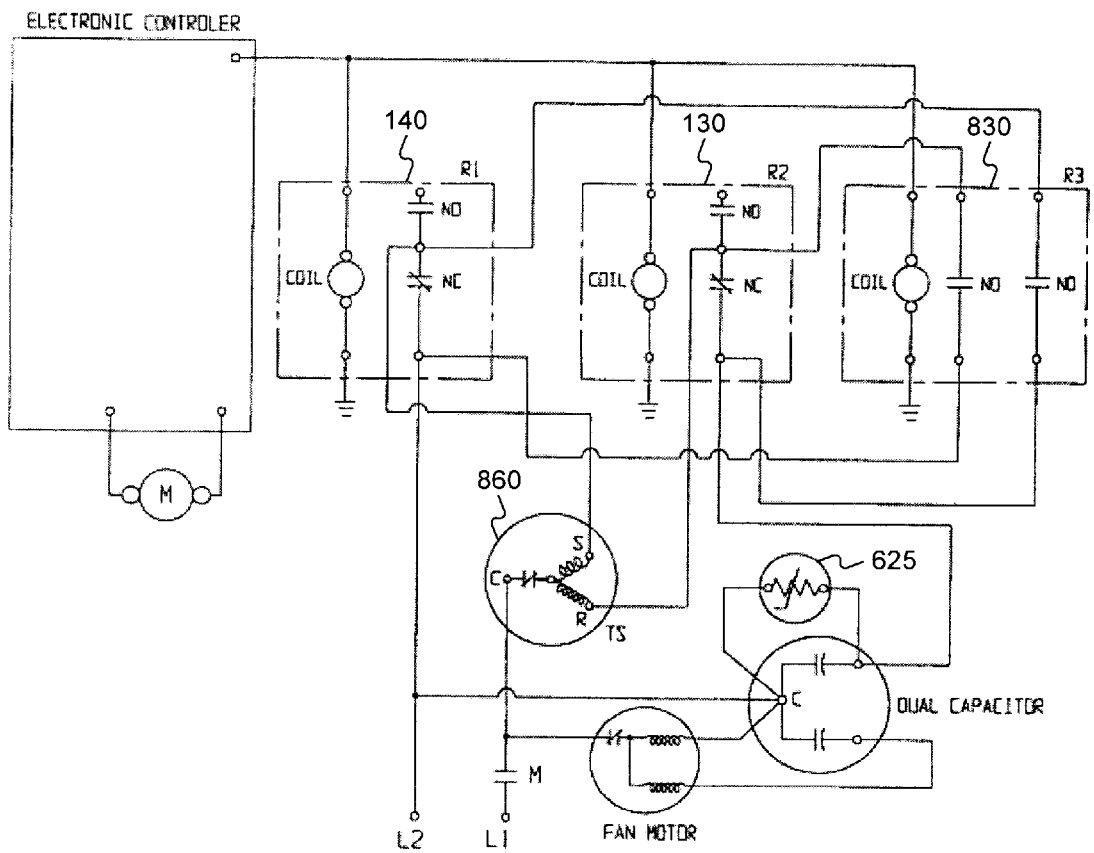
FIG. 8 illustrates an exemplary wiring scheme for use with a two stage compressor that uses start assist components and has a higher power load, in accordance with the present invention.

In environments where a higher power load is anticipated, the embodiment illustrated in FIG. 1 may be further modified as illustrated in FIG. 8. Referring to FIG. 8, the set of relays 130,140 of FIG. 1 is modified to include an additional relay (R3) 830 and to include a PTCR 625. The set of relays 130, 140, 830 includes three interconnected relays, which permits the use of system 800 in high power environments. Further, one of ordinary skill in the art may modify the embodiment illustrated in FIG. 8 to include additional relays without departing from the inventive concept embodied in FIG. 8.

Although FIG. 8 includes a soft start assist positive temperature coefficient thermistor (PTCR) 625, if hard start assist components are required, the PTCR 625 of FIG. 8 may be readily replaced by hard start assist components (see, e.g., the start relay (SR) 722, start capacitor (SC) 724, and contactor 723 of FIG. 7). Alternatively, the hard start assist components may consist of a "Kickstart" start device as disclosed in U.S. Pat. No. 5,162,718. Further, the motor 860 of FIG. 8 may be implemented with a single-cylinder motor or with a two-cylinder motor (e.g., with a high-speed mode and a low-speed or reverse mode) without departing from the spirit of the invention disclosed herein. Moreover, the embodiment of FIG. 8 may be implemented without soft start assist components or hard start assist components.

Figure 9:
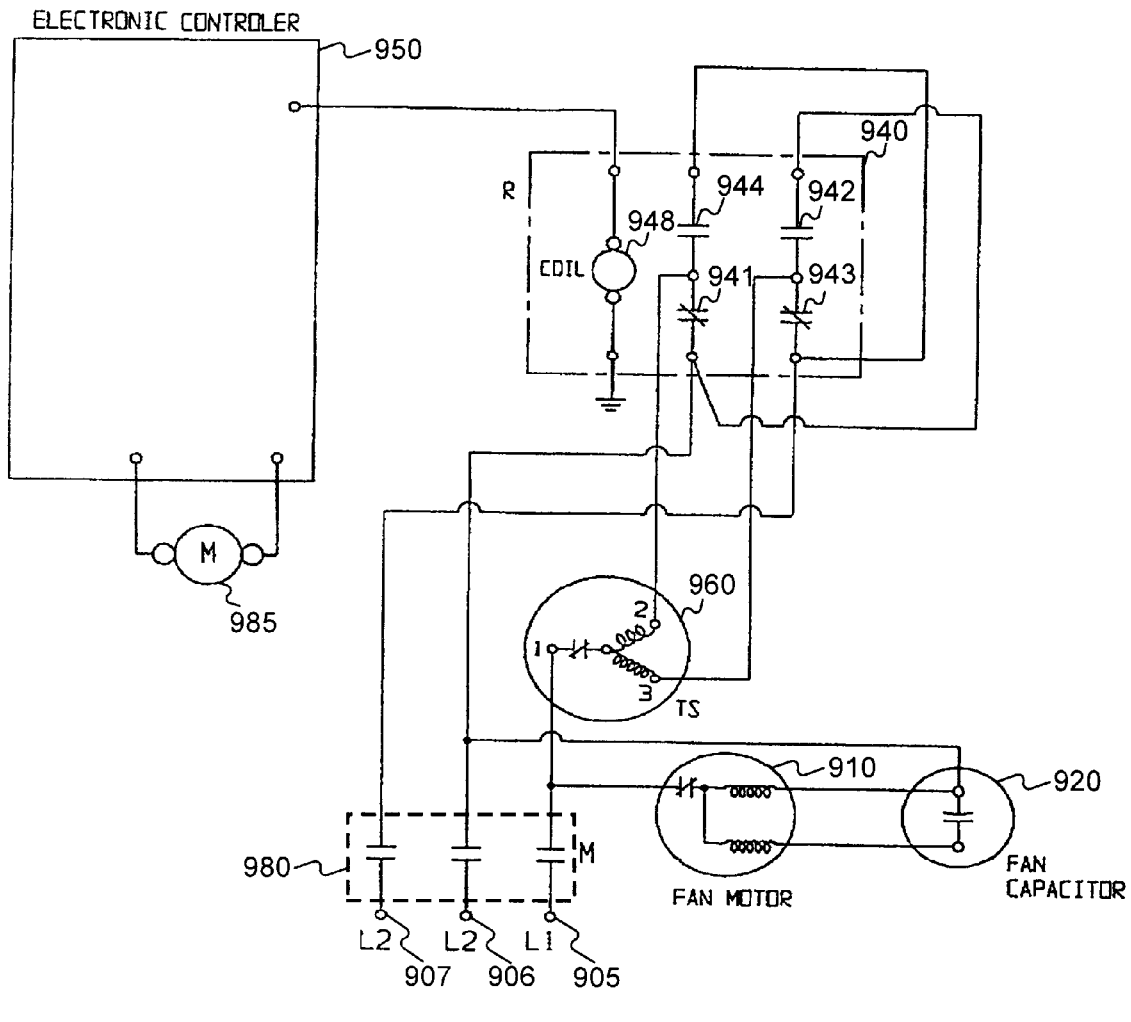
FIG. 9 illustrates an exemplary wiring scheme for use with a two stage compressor having a three-phase motor, in accordance with the present invention.

FIG. 9 illustrates another exemplary embodiment for use with three phase power air conditioners having higher loads (e.g., approximately 5 tons of capacity) in accordance with the present invention. Referring to FIG. 9, the relay includes a coil (M) 985 and a three phase contactor 980 that can open or close the supply of current from each of the first terminal (L1) 905, the second terminal (L2) 906, and the third terminal (L3) 907. When the three phase contactor 980 is open, the electronic controller 950 changes the phase connections to the motor 960 to change the direction of rotation, in accordance with the same method as applied in other embodiments (see, e.g., FIGS. 3–5). However, unlike the embodiment illustrated in FIG. 1, the system 900 in FIG. 9 uses a single DPDT relay 940 or two SPDT relays (not shown) to switch the phase connections and uses a single capacitor 920 for the fan motor 910. The capacitor 920 connects to the fan motor 910 and does not connect to the start winding or run winding of the compressor 960 since three phase compressor motors usually do not require run or start capacitance.

While the invention has been described for controlling a two stage, reversible compressor and an associated fan or similar electrical component of an HVAC system, the invention can also be applied to any system that requires the switching of windings on a motor to reverse the direction of the motor rotation.

The foregoing description of a preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to the system disclosed, but is capable of being embodied in a variety of ways and services.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling a two-stage reversible compressor, comprising
   a compressor motor;
   a fan motor;
   an electronic controller;
   a contactor controlled by the electronic controller, wherein the electronic controller determines whether to apply a source of line power to the contactor;
   a set of relays controlled by the electronic controller, a start winding of the compressor motor, and a run winding of the compressor motor, wherein the set of relays are connected to the source of line power in a manner to permit switching the source of line power to either the run winding or the start winding, and wherein the set of relays switches only when the contactor removes the source of line power from the set of relays; and
   a dual-run capacitor for operating the two-stage reversible compressor and the fan motor.

2. The system of claim 1 wherein the set of relays are connected to permit switching the dual-run capacitor to either the run winding or the start winding that is not connected to the source of line power.

3. The system of claim 2, wherein said dual-run capacitor is the only capacitor utilized in combination with run winding or the start winding.

4. The system of claim 2, wherein the set of relays switches only when a predetermined period of time elapses.

5. The system of claim 3, wherein said electronic controller determines whether to control the compressor in a first stage or in a second stage based on the at least one sensed parameter.

6. The system of claim 3, wherein said contactor controlled by the electronic controller is connected in series to the source of line power and to a common lead of the compressor motor, and wherein said electronic controller determines whether to apply the source of line power to said system and to the motor of the compressor motor based on at least one of the following sensed parameters: temperature, humidity, and pressure.

7. The system of claim 6, wherein said contactor is the only contactor that removes the source of line power to said compressor motor.

8. The system of claim 7, wherein each of the set of relays includes a rating for the maximum switching current, wherein the rating is less than maximum switching current rating for the contactor, and wherein the non-switching current rating for the set of relays satisfies a current load for the compressor motor and the fan motor.

9. The system of claim 8, wherein each of the set of relays includes a maximum switching rating that is less than or equal to about ninety percent of the maximum switching rating of said contactor.

10. The system of claim 1, wherein said compressor motor is a reversible, two stage compressor motor.

11. The system of claim 1, wherein said compressor motor is a three-phase compressor motor.

12. The system of claim 1 further comprising a start assist device for assisting the compressor motor during the start phase of operation of said compressor motor.

13. The system of claim 12, wherein the start assist devise comprises a positive temperature coefficient thermistor (PTCR) device, wherein said PTCR device is electrically connected to said dual-capacitor.

14. The system of claim 12, wherein the start assist devise comprises a hard start assist device, wherein said hard start device is electrically connected to said dual-capacitor.

15. The system of claim 1, wherein said electronic controller further comprises means for anticipating a demand for a second stage.

16. The system of claim 15, wherein said means for anticipating further comprises:
   means for determining whether a demand for a second stage is made while the system is in a first stage;
   memory for storing a quantity representative of the number of consecutive times said means for determining determines that a demand for a second stage is made while the system is in a first stage;
   means for initiating a second stage of heating or cooling when a demand for a first stage of heating or cooling is made and when the quantity equals or exceeds a predetermined quantity.

17. The system of claim 16, wherein said predetermined quantity equals two.

18. A method for controlling the motor of a compressor with a system, wherein said system performs the method comprising the steps of:
   switching at least one contactor connected to a source of line power to remove the source of line power to a set of relays and to a compressor motor containing a run winding, a start winding, and a common lead;
   controlling the set of relays by switching the set of relays to provide the source of line power to permit switching the source of line power to either the run winding or the start winding, wherein prior to said controlling, the at least one contactor removes the source of line power from the set of relays; and
   waiting a predetermined period of time before performing said controlling.

19. The method of claim 18 further comprising operating the compressor motor and a fan motor with a dual-run capacitor.

20. The method of claim 19 comprising energizing the at least one contactor connected to the source of line power to apply the source of line power to the set of relays and to the compressor motor.

21. The method of claim 19 wherein said step of controlling further comprises the substep of connecting the set of relays to permit switching the dual-run capacitor to either the run winding or the start winding that is not connected to the source of line power.

22. The method of claim 19, wherein said dual-run capacitor is the only capacitor utilized in combination with the run winding or the start winding.

23. The method of claim 18, wherein said step of controlling further comprises the substep of determining whether to control the compressor in a first stage or in a second stage based on at least one sensed parameter.

24. The method of claim 23, wherein the at least one sensed parameter comprises at least one of the following: temperature, humidity, and pressure.

25. The method of claim 18, wherein said switching further comprises the substep of defining the at least one contactor as an only contactor that removes the source of line power to said compressor motor and said set of relays.

26. The method of claim 25, wherein said only contactor is connected in series to the source of line power and to a common lead of the compressor motor.

27. The method of claim 25, wherein said step of switching further comprises defining the set of relays to include a rating for the maximum switching current, and wherein the rating is less than maximum switching current rating for the only contactor.

28. The method of claim 27, wherein each of the set of relays includes a maximum switching rating that is less than or equal to about ninety percent of the maximum switching rating of the only contactor, and wherein the non-switching current rating for the set of relays satisfies a current load for the compressor motor and the fan motor.

29. The method of claim 18 further comprising:
   receiving a demand for a first stage of heating or cooling; and
   operating in the first stage of heating or cooling until either a demand for a second stage of heating or cooling is received or the first stage is satisfied.

30. The method of claim 18 further comprising:
   receiving a demand for a second stage of heating or cooling; and
   operating in the second stage of heating or cooling until the demand for the second stage of heating or cooling is satisfied.

31. The method of claim 18, wherein the compressor motor is a reversible, two stage compressor motor.

32. The method of claim 18, wherein said compressor motor is a three-phase compressor motor.

33. The method of claim 18, further comprising anticipating a demand for a second stage of heating or cooling.

34. The method of claim 33, wherein anticipating further comprises:
   determining whether a demand for a second stage is made while the system is in a first stage;
   storing a quantity representative of the number of consecutive times said step of determining determines that a demand for a second stage is made while the system is in a first stage;
   initiating a second stage of heating or cooling when a demand for a first stage of heating or cooling is made and when the quantity equals or exceeds a predetermined quantity.

35. The method of claim 34, wherein said predetermined quantity equals two.

36. A computer readable medium containing computer software, which, when run on a computer causes the computer to provide apparatus for controlling the motor of a compressor, the apparatus comprising:
   means for switching at least one contactor connected to a source of line power to remove the source of line power to a set of relays and to a compressor motor containing a run winding, a start winding, and a common lead;
   means for controlling the set of relays by switching the set of relays to provide the source of line power to permit switching the source of line power to either the run winding or the start winding, wherein prior to switching by said means for controlling, the at least one contactor removes the source of line power from the set of relays; and
   means for waiting a predetermined period of time before the means for controlling switches the set of relays.

37. The computer readable medium of claim 36, wherein said means for controlling further comprises means for anticipating a demand for a second stage of heating or cooling.

38. The computer readable medium of claim 37, wherein said means for anticipating further comprises:
   means for determining whether a demand for a second stage is made while the system is in a first stage;
   memory for storing a quantity representative of the number of consecutive times said means for determining determines that a demand for a second stage is made while the system is in a first stage;
   means for initiating a second stage of heating or cooling when a demand for a first stage of heating or cooling is made and when the quantity equals or exceeds a predetermined quantity.

39. The computer readable medium of claim 38, wherein the predetermined quantity equals two.

* * * * *

UNITED STATES PATENT AND TRADEMARK OFFICE
CERTIFICATE OF CORRECTION

PATENT NO. : 6,318,966 B1  
DATED : November 20, 2001  
INVENTOR(S) : Steven M. Madara, Johnthinh N. Tran and Ronald R. Rayburn Page 1 of 1

It is certified that error appears in the above-identified patent and that said Letters Patent is hereby corrected as shown below:

<u>Column 14,</u>  
Line 26, change "devise" to -- device --.

<u>Column 29,</u>  
Line 29, change "devise" to -- device --.

Signed and Sealed this

Thirtieth Day of April, 2002

Attest:

Attesting Officer

JAMES E. ROGAN  
*Director of the United States Patent and Trademark Office*